US008879574B2

(12) United States Patent
Dayanandan et al.

(10) Patent No.: US 8,879,574 B2
(45) Date of Patent: Nov. 4, 2014

(54) DISTRIBUTED SEAMLESS ROAMING IN WIRELESS NETWORKS

(71) Applicant: Ubiquiti Networks, Inc., San Jose, CA (US)

(72) Inventors: Sriram Dayanandan, San Jose, CA (US); Bo-chieh Yang, San Jose, CA (US); Yuan-Hsiang Lee, Taipei (TW); Keh-Ming Luoh, Fremont, CA (US); Robert J. Pera, San Jose, CA (US)

(73) Assignee: Ubiquiti Networks, Inc., San Jose, CA (US)

( * ) Notice: Subject to any disclaimer, the term of this patent is extended or adjusted under 35 U.S.C. 154(b) by 0 days.

(21) Appl. No.: 14/101,197

(22) Filed: Dec. 9, 2013

(65) Prior Publication Data

US 2014/0112311 A1 Apr. 24, 2014

Related U.S. Application Data

(63) Continuation of application No. 13/763,537, filed on Feb. 8, 2013.

(60) Provisional application No. 61/716,431, filed on Oct. 19, 2012.

(51) Int. Cl.
| | | |
|---|---|---|
| H04L 12/28 | (2006.01) |
| H04W 48/16 | (2009.01) |
| H04W 36/18 | (2009.01) |
| H04W 36/30 | (2009.01) |
| H04W 72/08 | (2009.01) |
| H04J 1/16 | (2006.01) |
| H04W 84/18 | (2009.01) |
| H04W 88/08 | (2009.01) |

(52) U.S. Cl.
CPC .............. *H04W 36/30* (2013.01); *H04W 84/18* (2013.01); *H04W 48/16* (2013.01); *H04W 36/18* (2013.01); *H04W 72/085* (2013.01); *H04W 88/08* (2013.01)
USPC ........................... 370/462; 370/252; 370/329

(58) Field of Classification Search
USPC .......................................... 370/252, 329, 462
See application file for complete search history.

(56) References Cited

U.S. PATENT DOCUMENTS

| | | |
|---|---|---|
| 5,131,006 A | 7/1992 | Kamerman et al. |
| 5,151,920 A | 9/1992 | Haagh et al. |
| 5,295,154 A | 3/1994 | Meier et al. |
| 5,406,260 A | 4/1995 | Cummings et al. |
| 5,422,887 A | 6/1995 | Diepstraten et al. |
| 5,428,636 A | 6/1995 | Meier |
| 5,504,746 A | 4/1996 | Meier |
| 5,546,397 A | 8/1996 | Mahany |
| 5,706,428 A | 1/1998 | Boer et al. |

(Continued)

FOREIGN PATENT DOCUMENTS

WO 2010049113 A1 5/2010

*Primary Examiner* — John Pezzlo
(74) *Attorney, Agent, or Firm* — Shun Yao; Park, Vaughan, Fleming & Dowler LLP

(57) ABSTRACT

One embodiment of the present invention provides a system for configuring an access point in a wireless network. During operation, the access point discovers one or more existing access points associated with the wireless network. The access point then obtains a set of configuration information from one existing access point, and synchronizes a local timestamp counter to a selected existing access point, thereby allowing the access point to be configured without using a centralized management station.

17 Claims, 7 Drawing Sheets

(56) References Cited

U.S. PATENT DOCUMENTS

| | | |
|---|---|---|
| 5,740,366 A | 4/1998 | Mahany et al. |
| 5,844,893 A | 12/1998 | Gollnick et al. |
| 5,940,771 A | 8/1999 | Gollnick et al. |
| 6,046,992 A | 4/2000 | Meier et al. |
| 6,130,892 A | 10/2000 | Short et al. |
| 6,374,311 B1 | 4/2002 | Mahany et al. |
| 6,563,786 B1 | 5/2003 | Nee |
| 6,636,894 B1 | 10/2003 | Short et al. |
| 6,665,536 B1 | 12/2003 | Mahany |
| 6,697,415 B1 | 2/2004 | Mahany |
| 6,714,559 B1 | 3/2004 | Meier |
| 6,789,110 B1 | 9/2004 | Short et al. |
| 6,826,165 B1 | 11/2004 | Meier et al. |
| 6,865,169 B1 | 3/2005 | Quayle et al. |
| 6,875,009 B2 | 4/2005 | Kayahara et al. |
| 6,992,972 B2 | 1/2006 | Van Nee |
| 7,013,138 B2 | 3/2006 | Mahany |
| 7,194,554 B1 | 3/2007 | Short et al. |
| 7,386,002 B2 | 6/2008 | Meier |
| 7,457,646 B2 | 11/2008 | Mahany et al. |
| 7,483,397 B2 | 1/2009 | Meier et al. |
| 7,483,984 B1 | 1/2009 | Jonker et al. |
| 7,535,921 B2 | 5/2009 | Meier |
| 7,536,167 B2 | 5/2009 | Gollnick et al. |
| 7,548,553 B2 | 6/2009 | Meier |
| 7,554,995 B2 | 6/2009 | Short et al. |
| 7,558,557 B1 | 7/2009 | Gollnick et al. |
| 7,710,907 B2 | 5/2010 | Mahany |
| 7,733,835 B2 | 6/2010 | Sammour et al. |
| 7,826,426 B1 | 11/2010 | Bharghavan et al. |
| 7,826,818 B2 | 11/2010 | Gollnick et al. |
| 7,873,343 B2 | 1/2011 | Gollnick et al. |
| 7,916,747 B2 | 3/2011 | Meier |
| 7,917,145 B2 | 3/2011 | Mahany et al. |
| 8,156,246 B2 | 4/2012 | Short et al. |
| 8,184,061 B2 | 5/2012 | Sanford |
| 8,266,266 B2 | 9/2012 | Short et al. |
| 8,266,269 B2 | 9/2012 | Short et al. |
| 8,364,806 B2 | 1/2013 | Short et al. |
| 8,400,997 B2 | 3/2013 | Pera et al. |
| 8,421,700 B2 | 4/2013 | Sanford |
| 8,421,704 B2 | 4/2013 | Sanford |
| 2004/0133913 A1 | 7/2004 | Benveniste |
| 2004/0151126 A1 | 8/2004 | Matsubara |
| 2005/0048971 A1 | 3/2005 | Findikli et al. |
| 2006/0079230 A1 | 4/2006 | Russell |
| 2006/0116170 A1 | 6/2006 | Brahmbhatt et al. |
| 2006/0128371 A1 | 6/2006 | Dillon et al. |
| 2007/0086424 A1 | 4/2007 | Calcev et al. |
| 2008/0125129 A1 | 5/2008 | Lee |
| 2008/0165731 A1 | 7/2008 | Zellner |
| 2008/0165735 A1 | 7/2008 | Chen et al. |
| 2008/0219198 A1 | 9/2008 | Honkasalo et al. |
| 2009/0157844 A1 | 6/2009 | Fionda et al. |
| 2009/0240791 A1 | 9/2009 | Sakurai et al. |
| 2009/0252127 A1 | 10/2009 | Rangarajan et al. |
| 2010/0306320 A1 | 12/2010 | Leppanen et al. |
| 2011/0185011 A1* | 7/2011 | Shuman et al. ............... 709/203 |
| 2011/0211559 A1 | 9/2011 | Lim et al. |
| 2014/0022918 A1* | 1/2014 | Guo et al. ..................... 370/252 |

* cited by examiner

DISTRIBUTED SEAMLESS ROAMING IN WIRELESS NETWORKS

RELATED APPLICATIONS

This application is a continuation of U.S. application Ser. No. 13/763,537, entitled "DISTRIBUTED SEAMLESS ROAMING IN WIRELESS NETWORKS," by inventors Sriram Dayanandan, Bo-chieh Yang, Yuan-Hsiang Lee, Keh-Ming Luoh, and Robert J. Pera, filed 8 Feb. 2013, which claims the priority to U.S. Provisional Patent Application No. 61/716,431, filed 19 Oct. 2012, entitled "Distributed Seamless Roaming in Wireless Networks."

BACKGROUND

1. Field

This disclosure is generally related to wireless networks. More specifically, this disclosure is related to a method and system for facilitating seamless roaming in a wireless network.

2. Related Art

In recent years, the phenomenal growth of mobile devices, such as smart phones and tablet computers, has resulted in a huge demand in wireless networks. Particularly, Wi-Fi networks, which are based on the IEEE-802.11 family of standards, are becoming increasingly ubiquitous. In a typical Wi-Fi network, an end-user station can move freely within the range of an access point's (AP's) radio transceiver while maintaining high-speed data connectivity.

In a large-scale network, such as an enterprise or campus network, provisioning such a Wi-Fi network is non-trivial. One challenge is how to cover a large area with multiple APs, while providing a user with the experience that when he changes his location he remains within the same Wi-Fi network, and his device continues to communicate with the same AP. Typically, end-user stations tend to be "sticky." That is, a station is unlikely to change the physical AP it communicates with unless it is absolutely necessary, due to the handover overhead (such as disruption to communication). Also, APs have more transmission power than stations. Hence, a station might "hear" an AP loud and clear, but the AP might not be able to receive reliably signals transmitted by the station.

Currently, to facilitate a large-scale Wi-Fi network that uses multiple APs, a centralized switch and management station is used to coordinate all the APs. This centralized approach is costly, requires a significant amount of configuration, and presents a single point of failure in the network.

SUMMARY

One embodiment of the present invention provides a system for configuring an access point in a wireless network. During operation, the access point discovers one or more existing access points associated with the wireless network. The access point then obtains a set of configuration information from one existing access point, and synchronizes a local timestamp counter to a selected existing access point, thereby allowing the access point to be configured without using a centralized management station.

In a variation on this embodiment, the set of configuration information comprises a group or broadcast/multicast encryption key.

In a variation on this embodiment, the set of configuration information comprises an association ID (AID) usage indication which indicates one or more AIDs currently in use by the one or more existing access points.

In a further variation, the AID usage indication is an AID usage bitmap. In addition, a respective bit of the AID usage bitmap corresponds to an AID and indicates whether the AID is used by any access point in the wireless network.

In a variation on this embodiment, synchronizing the local timestamp counter to the selected existing access point involves selecting the existing access point based on timestamp hierarchy associated with the one or more existing access points.

In a variation on this embodiment, discovering the one or more existing access points comprises transmitting a broadcast discovery message on a wired network.

One embodiment of the present invention provides a system for associating a user station with an access point in a wireless network. During operation, the access point receives a first authentication packet from the user station. The access point then places the user station in an association-arbitration list. Subsequently, the access point broadcasts signal-strength indication associated with the user station, and receives signal-strength indication associated with the user station from other access points in the wireless network. The access point then determines whether the access point has the best signal strength associated with the user station, and in response to the access point having the best signal strength, associates the user station with the access point.

In a variation on this embodiment, the access point waits for a predetermined period of time prior to determining whether the access point has the best signal strength, thereby allowing sufficient time for receiving signal-strength indication from other access points.

In a variation on this embodiment, associating the user station with the access point involves assigning an AID to the user station and setting a bit in an AID usage bitmap, wherein the bit corresponds to the assigned AID. Furthermore, the access point broadcasts the AID usage bitmap to other access points in the wireless network.

In a variation on this embodiment, the access point determines that the signal strength associated with the user station is below a predetermined threshold. The access point then queries other access points for their signal strength associated with the same user station. In response to there being at least one other access point receiving a sufficiently strong signal from the user station, the access point hands over the user station to the access point with the strongest signal strength.

In a variation on this embodiment, the access point hands over one or more user stations associated with the access point to one or more other access points. Subsequently, the access point performs maintenance on access point without disruption to service for the one or more user stations that have been handed over.

In a further embodiment, while performing the maintenance, the access point upgrades its firmware or performs spectrum scanning.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Embodiments of the present invention solve the problem of facilitating seamless roaming in a Wi-Fi network by using APs that can join an existing cluster of APs of the same Wi-Fi network with automatic configuration, without the need of a centralized management station. In particular, when a new AP joins an existing Wi-Fi network, the new AP can automatically synchronize its clock to the existing APs, obtain all the configuration information, and associate with and handover roaming stations with seamless transition without the need to use a centralized management station or controller.

Figure 1:
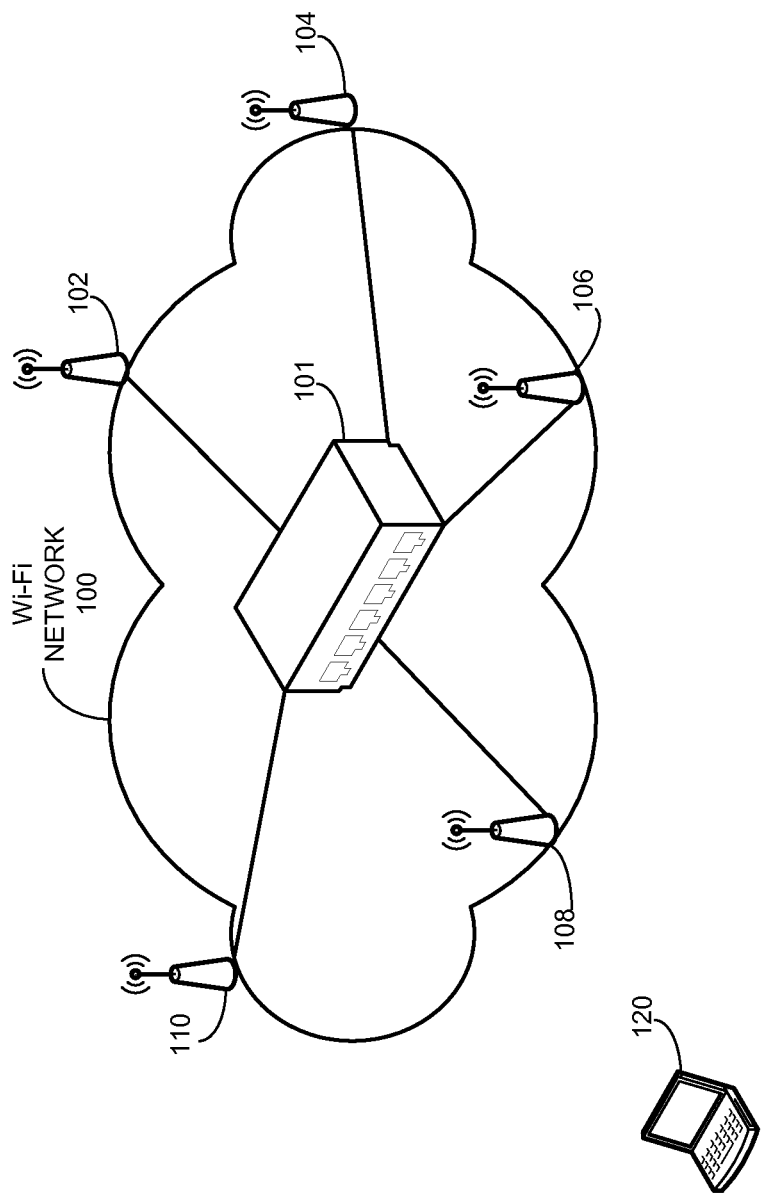
FIG. 1 illustrates an exemplary Wi-Fi network that facilitates seamless station roaming, in accordance with one embodiment of the present invention.

FIG. 1 illustrates an exemplary Wi-Fi network that facilitates seamless station roaming, in accordance with one embodiment of the present invention. In this example, a Wi-Fi network 100 includes a number of Aps, 102, 104, 106, 108, and 110, which are coupled to a layer-2 (e.g., Ethernet) switch 101 via wired links. A user station 120 participates in Wi-Fi network 100 by communicating with one of the APs. Note that switch 101 is only a layer-2 switch, and is not required to configure APs as a conventional centralized management station does.

The challenge in provisioning a Wi-Fi network, like network 100, is how to make all APs work together, so that from a user's perspective, station 120 appears to be communicating with only one physical AP as station 120 moves around in network 100. To achieve this goal, some embodiments of the present invention employs several automatic configuration mechanisms to allow an AP to join an existing Wi-Fi network.

In general, a Wi-Fi network like network 100 has a unique medium access control (MAC) address (also known as basic service set identification (BSSID)). Also, network 100 has a network name (also known as Service set identification (SSID)). Wi-Fi network 100 also has a radio frequency of operation, which governs the transceiver frequency of all the AP radios, and a security profile, which controls authentication of stations and encryption/decryption of wireless data traffic. Hence, a Wi-Fi network, or a wireless basic service set (WB), is uniquely identifiable by:

$$WB_i = (BSSID, SSID, frequency, security\ profile).$$

Furthermore, two or more APs that implement the same WB can form a roaming cluster (RC). In the example illustrated in FIG. 1, network 100 is one RC. Typically, an RC is configured with a unique encryption key set by the network administrator. In addition, each AP has a timestamp counter, or timing synchronization function (TSF), which can be a 32 or 64-bit micro-second counter maintained by the radio chipset.

During operation, when a new AP joins an existing RC, the AP performs following operations: (1) discovery and key synchronization; and (2) timestamp synchronization. The discovery and key synchronization process is for the new AP to acquire knowledge of the RC and some basic information needed for communication within the RC. Timestamp synchronization is necessary for all the AP in the RC to behave like one AP. In other words, when a station roams from one AP to another, the packets coming from the APs should have consistent timestamps. The discovery and key synchronization and timestamp synchronization processes are described in more details below.

When a new AP joins an existing RC such as network 100, the new AP is first plugged into layer-2 switch 101. The AP then multicasts on the wired network via layer-2 switch 101 a discover message to all other APs in the same RC.

If one or more other APs belonging to the same RC exist, they respond to the discover message with the following information: (1) group or broadcast/multicast encryption key; and (2) 802.11 Association ID (AID) usage bitmap. The group encryption key is used to encrypt broadcast or multicast traffic, and is common to the entire RC. If no other member AP in the same RC exists, the new AP generates a unique group or broadcast/multicast encryption key.

The AID usage bitmap indicates a member AP's current association with user stations. An AID is a unique identifier that identifies a user station associated with a particular AP. Generally, the AID value is locally unique to a particular AP. In embodiments of the present invention, since an RC contains multiple APs that behave as one single AP, the AIDs assigned to the user stations need to be cluster-wide unique. In one embodiment, all member APs maintain an AID bitmap. A respective bit in this AID bitmap (e.g., a value of "1") indicates whether the AID value corresponding to that bit is used by a station. Hence, when the new AP joins an RC, the received AID bitmap indicates what AID values are still available.

The aforementioned automatic configuration process allows an AP to join an existing network and a user station to roam seamlessly within the wireless network without using a centralized controller or management station.

Figure 2:
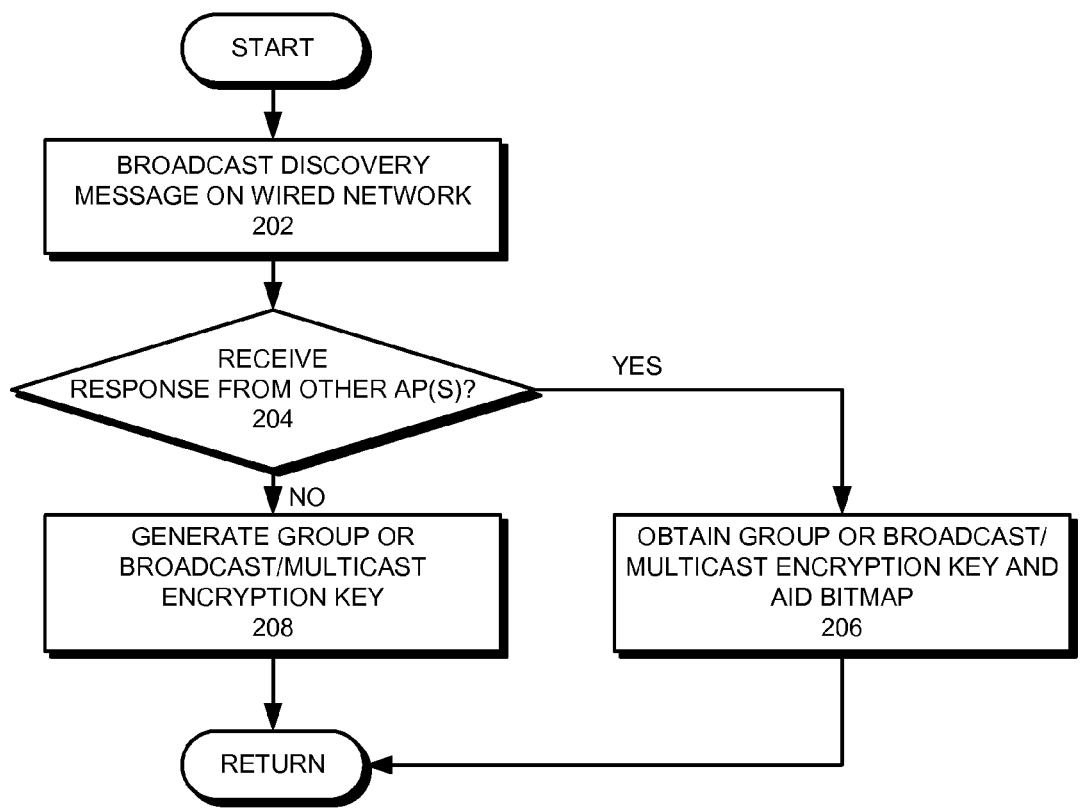
FIG. 2 presents a flowchart illustrating an exemplary discovery and key synchronization process for a new AP joining an RC, in accordance with one embodiment of the present invention.

FIG. 2 presents a flowchart illustrating an exemplary discovery and key synchronization process for a new AP joining an RC, in accordance with one embodiment of the present invention. During operation, the new AP first broadcasts a discovery message on the wired network (operation 202). Next, the new AP determines whether it has received response from other AP(s) in the same RC (operation 204). If no response has been received, the new AP generates the group or broadcast/multicast encryption key (operation 208). If at least one response is received, the new AP obtains the group or broadcast/multicast encryption key and the AID bitmap for the RC (operation 206).

As mentioned above, another task the new AP may perform is to synchronize its TSF with other member APs. In one embodiment, the new AP scans its radio for beacon packets transmitted wirelessly from the discovered member APs belonging to the same RC. In general, a beacon packet includes the TSF value (time of transmission) and a TSF- HIERARCHY-ID of the transmitting AP. The TSF-HIERARCHY-ID indicates the hierarchy in which an AP derives its TSF. For example, the very first AP for an RC has a TSF-HIERARCHY-ID of 0. Other APs that derive their TSF values from the first AP have a TSF-HIERARCHY-ID of 1, and so forth. Hence, for an AP, the lower the TSF-HIERARCHY-ID value is, the more accurate timing it has.

After receiving beacon packets from other APs, the new AP selects the AP whose beacon packet contains the lowest TSF-HIERARCHY-ID value, and synchronizes the local TSF with the selected AP. In addition, the new AP sets its own TSF-HIERARCHY-ID to be the lowest TSF-HIERARCHY-ID+1.

Figure 3:
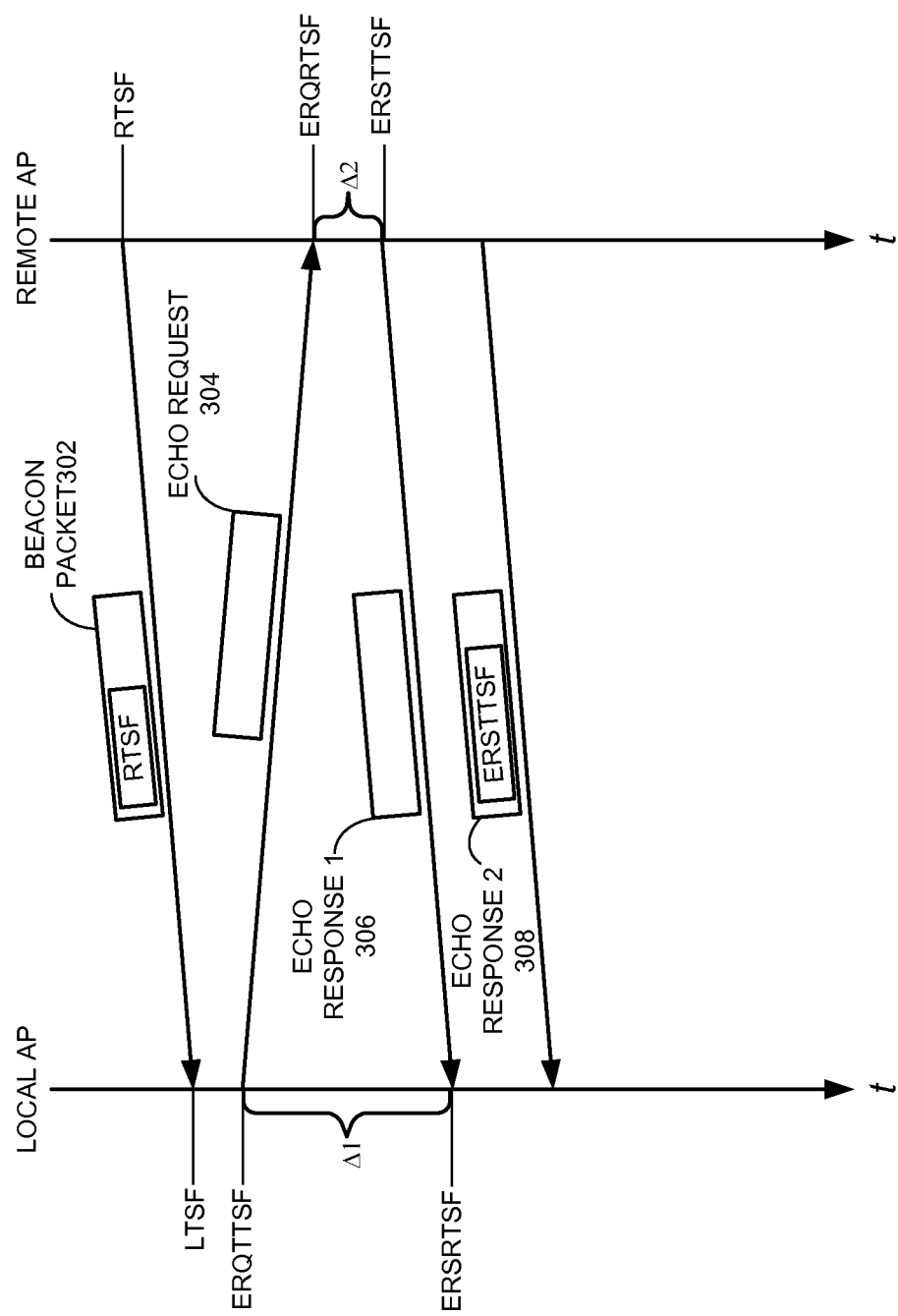
FIG. 3 presents a timing diagram illustrating the process of synchronizing the timestamp counter of a local AP to the timestamp counter of a remote AP, in accordance with one embodiment of the present invention.

FIG. 3 presents a timing diagram illustrating the process of synchronizing the timestamp counter of a local AP to the timestamp counter of a remote AP, in accordance with one embodiment of the present invention. During operation, the local AP first receives a timing beacon packet 302 from a remote AP, wherein beacon packet 302 contains the TSF value of the remote AP when beacon packet 302 was transmitted (denoted as time "RTSF"). When the local AP receives beacon packet 302, the value of its TSF is denoted as "LTSF," which is contained in a receive descriptor that accompanies the received beacon packet.

Next, the local AP sends the remote AP an "ECHO REQUEST" packet 304 over the radio to the remote AP. The local time of transmission of echo request packet 304 is denoted as "ERQTTSF" (which stands for "echo request transmit TSF"). When echo request packet 304 reaches the remote AP, the remote AP's TSF value is denoted as "ERQRTSF" (which stands for "echo request receive TSF").

Subsequently, at time ERSTTSF (which stands for "echo response transmit TSF"), the remote AP transmits an first "ECHO RESPONSE" packet 306, which is in turn received by local AP at time ERSRTSF (which stands for "echo response receive TSF"). Shortly after, the remote AP sends a second echo response packet 308, which contains the value of ERSTTSF. This way, local AP has all the information it needs to calculate a one-way time-of-flight (TOF) delay between the local AP and the remote AP. This TOF is calculated as:

$$TOF=((ERQRTSF-ERQTTSF)+(ERSRTSF-ERSTTSF))/2.$$

That is, the round-trip time (RTT, which is twice the TOF) between the local AP and remote AP can be calculated as $\Delta 1-\Delta 2$, as illustrated in FIG. 3. Note that $\Delta 1=(ERSRTSF-ERQTTSF)$; and $\Delta 2=(ERSTTSF-ERQRTSF)$. Hence, RTT= $(ERSRTSF-ERQTTSF)-(ERSTTSF-ERQRTSF)=2\times TOF$.

Subsequently, the local AP synchronizes its local TSF as follows:

$$TSF=RTSF+(LNTSF-LTSF)+TOF;$$

wherein LNTSF is the current TSF reading at the local AP.

Figure 4:
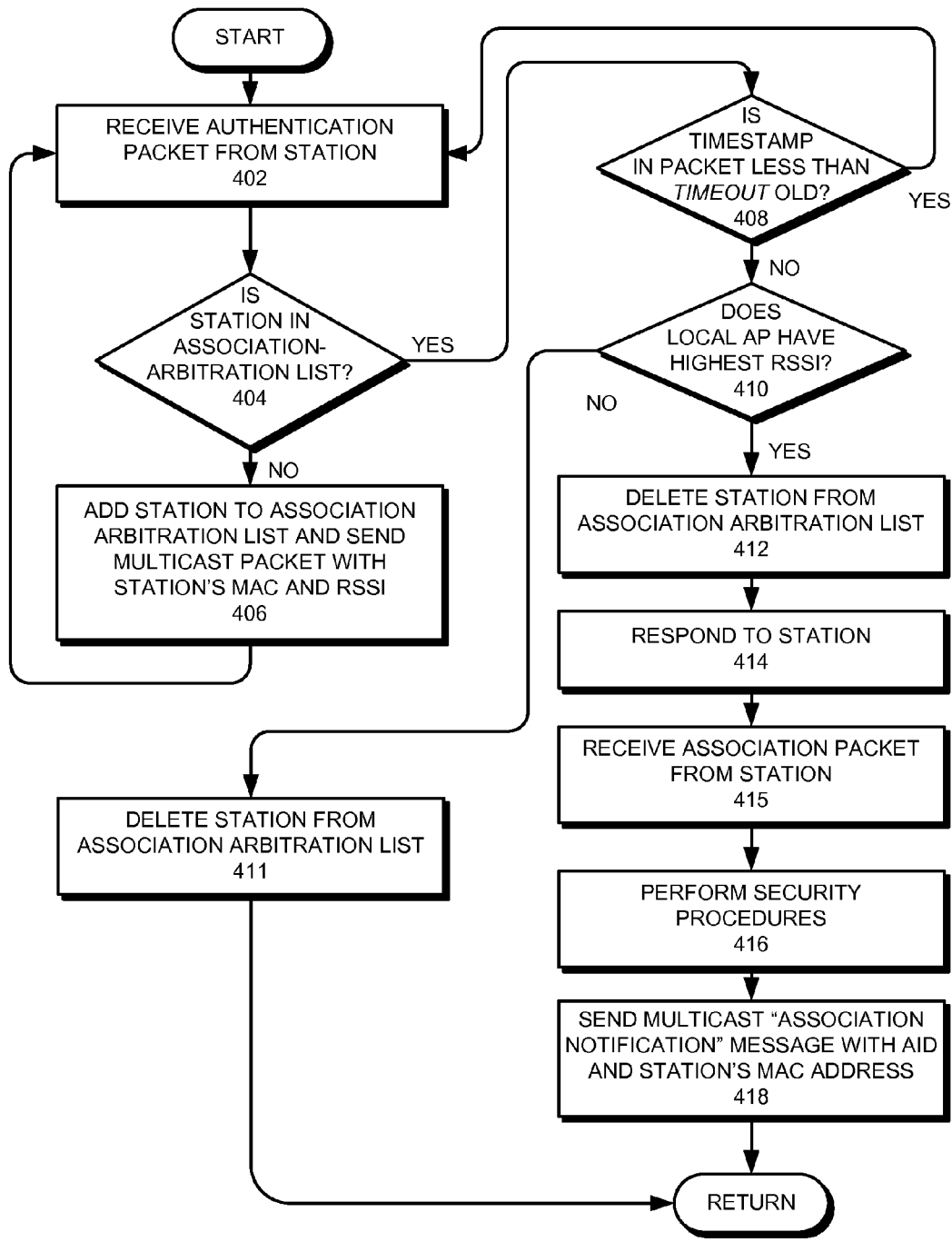
FIG. 4 presents a flowchart illustrating an exemplary process of a station joining an AP, in accordance with one embodiment of the present invention.

After the new AP successfully joins the RC, a station can now be associated with the newly joined AP. FIG. 4 presents a flowchart illustrating an exemplary process of a station joining an AP, in accordance with one embodiment of the present invention. During operation, an AP first receives an AUTHENTICATION packet from a station (operation 402). The AP maintains an "ASSOCIATION-ARBITRATION" list, which temporarily holds the MAC addresses of stations that are in the process of associating with the AP. The AP then determines whether the station from which the authentication packet is received is in the ASSOCIATION-ARBITRATION list (operation 404). If the station is not in the ASSOCIATION-ARBITRATION list, which means that this is the first time that the station attempts to associate with the AP, the AP adds the station to the ASSOCIATION-ARBITRATION list with a timestamp, and sends a multicast packet on the wired network with the station's MAC address and a relative signal strength indicator (RSSI) value based on the received authentication packet (operation 406). This operation allows all the APs in the RC to note down the RSSI with regard to the other APs. Next, the AP waits for the station to send another authentication packet (operation 402).

If the MAC address of the station already exists in the ASSOCIATION-ARBITRATION list, the AP determines whether the timestamp associated with the station's entry in the ASSOCIATION ARBITRATION table is less than TIMEOUT old (operation 408). If so, the AP does not do anything and waits for the next authentication packet from the same station (operation 402). This waiting period gives all the APs that can "hear" the station sufficient time to exchange their respective RSSI information.

If the timestamp is more than TIMEOUT old, the AP further determines whether itself has the highest RSSI for the station (operation 410). This step allows all the APs that can "hear" the station to elect among themselves the AP that can "hear" the station the best. If the local AP is the not the one with the highest RSSI, it deletes the station's MAC address from its ASSOCIATION-ARBITRATION list (operation 411). If the local AP has the highest RSSI, it first deletes the station's MAC address from the ASSOCIATION-ARBITRATION list (operation 412). Note that all other APs that have received the station's authentication packet also delete the station from their respective ASSOCIATION-ARBITRATION list. Additionally, all APs purge unused entries from the ASSOCIATION-ARBITRATION list in the event that no further AUTHENTICATION packet is received.

Next, the local AP responds to the station with an AUTHENTICATION response packet (operation 414). The local AP further receives an ASSOCIATION packet from the station (operation 415). Subsequently, the AP performs a set of security procedures with the station (operation 416). Such procedures may include 802.11i, WPA, or WPA2 security operations. Lastly, the AP sends a multicast "ASSOCIATION NOTIFICATION" message on the wired network to all APs in the RC (operation 418). This ASSOCIATION NOTIFICATION message contains the station's MAC address and its newly assigned AID. In response, all the APs can update their AID bitmap to reflect the new AID assigned to the station.

When a station disassociates with an AP, the AP can send a multicast "DISASSOCIATION NOTIFICATION" message to all other APs. In response, all the APs update their AID bitmaps to release the AID previously assigned to the disassociated station.

One utility of some embodiments of the present invention is that a station can freely and seamlessly roam within the Wi-Fi network, where APs can handle station handover automatically. To facilitate such seamless roaming, an AP currently associated with a station regularly monitors the RSSI for that station, and when the RSSI drops below a certain threshold, the AP selects from other APs one that has the best RSSI, and handover the station. In one embodiment, an AP uses three parameters to control the handover: RSSI check interval (RCI), RSSI check threshold (RCT), and RSSI check switch threshold (RCST). During operation, an AP checks the RSSI for a station regularly at each RCI. If the RSSI falls below RCT, the AP queries all other APs for their RSSI corresponding to the same station (even if the other APs are not associated with the station). If the difference between the current AP's RSSI and another AP's RSSI is greater than RCST, the current AP hands over the station to the other AP.

Note that, since all APs in the RC use the same frequency, any AP can observe the signal strength for stations associated with another member AP which is in its vicinity. In one embodiment, when an AP receives a data packet from a station that is not in its associated station list, the AP makes an entry for the station in its "OTHER-AP-STATIONS" list, along with the RSSI of the received packet. If such an entry already exists, the AP shall average the RSSI value over multiple RCI periods. Additionally, an AP age out entries in the "OTHER-AP-STATIONS" list if the AP stops receiving packets from such stations.

Figure 5:
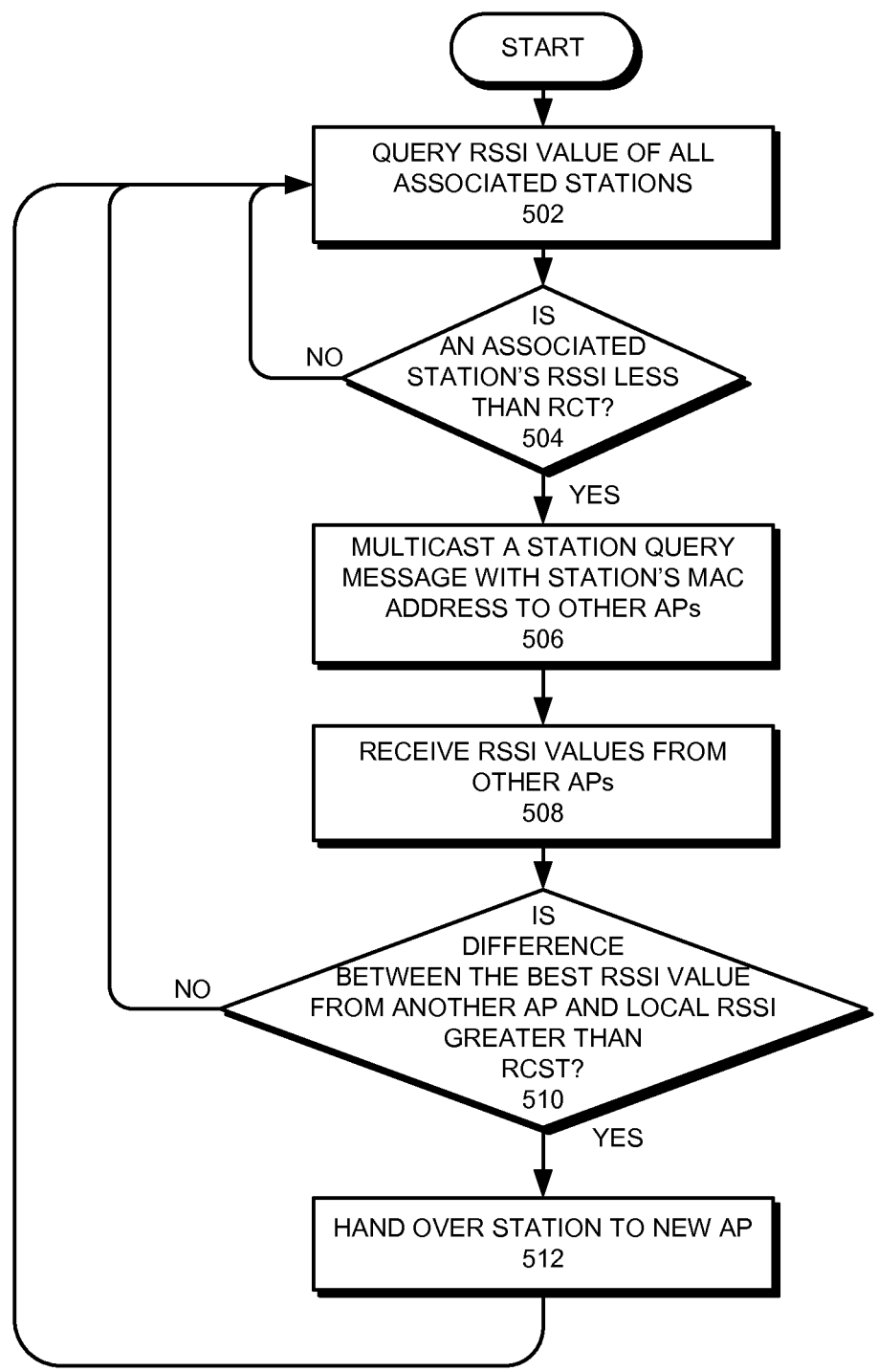
FIG. 5 presents a flowchart illustrating an exemplary process of monitoring an associated station and initiating station roaming, in accordance with one embodiment of the present invention.

FIG. 5 presents a flowchart illustrating an exemplary process of monitoring an associated station and initiating station roaming, in accordance with one embodiment of the present invention. During operation, an AP queries the RSSI value of all the associated stations in each RCI period (operation 502). In one embodiment, if the last received packet from a station was received more than 4 RCI periods ago, the RSSI value for that station is set to 0.

Subsequently, the AP determines whether an associated station's RSSI is less than RCT (operation 504). If not, the AP continues to monitor the RSSI for all associated stations (operation 502). If a stations RSSI falls below RCT, the AP sends out a multicast query message to all the APs with the station's MAC address (operation 506). Upon receiving the query message, all APs consult their respective "OTHER-AP-STATIONS" list and respond back with a "STA-QUERY-RESPONSE" message indicating the average RSSI for that station. In response the AP receives RSSI values from the other APs (operation 508). The AP then determines whether the difference between the best RSSI value received from another AP and its own RSSI is greater than RCST (operation 510). If not, the AP continues to monitor the RSSI for all the associated stations (operation 502).

If the RSSI difference is greater than RCST, the AP hands over the station to the new AP (operation 512). In one embodiment, the current AP sends a "HANDOVER REQUEST" message to the target AP. In response, the target AP sends a "SWITCH REQUEST" message back to the current AP, which in turn responds with a "SWITCH RESPONSE" message that contains:
 (1) the station's AID;
 (2) 802.11 association information elements, such as listen interval, capability; WPA/RSN, HT capabilities, etc.;
 (3) 802.11i/WPA2/WPA station information, e.g., PTK, PMK, etc.; and
 (4) 802.11 block-ACK and aggregation states for various TIDs.

Upon receiving all the station information, the target AP adds the station to its list of associated stations. In addition, the target AP conducts a roaming switch. That is, the target AP sends a dummy packet to the layer-2 switch via the wired network with the station's MAC address as the packet's source MAC address. This way, the layer-2 switch can update its MAC forwarding table accordingly, and forward future packets destined for the station to the target AP.

Subsequently, the current AP flushes out any remaining packets in its buffers before removing the station from its associated station list.

Note that the roaming process can be used for software upgrades without disruption. Normally, the process of conducting firmware upgrades is disruptive to the users. When using the roaming process described above, an AP can first hand over all its associated stations to the best alternative AP before upgrading itself. After the upgrade, the next AP can conduct the upgrade in a similar manner. Hence, the entire network can be upgraded without any network disruption.

Furthermore, embodiments of the present invention facilitate spectrum scans without disruption. Normally, APs conduct spectrum scans at startup. Since the RF environment is dynamic, spectrum scans need to be conducted at regular intervals in order to use the best available frequency. Using the roaming process described above, an AO can first hand over all its associated stations to the best alternative APs before conducting a spectrum scan. In addition, the APs can repeat this scan process across the network to decide the best frequency based on the input from all APs.

Figure 6A:
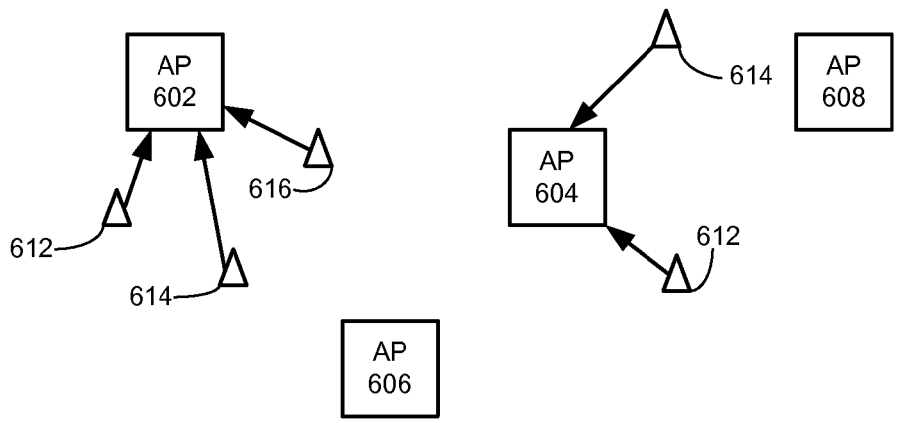
FIGS. 6A, 6B, and 6C illustrate an exemplary process of performing rolling maintenance on a number of APs without service disruption, in accordance with one embodiment of the present invention.
Figure 6B:
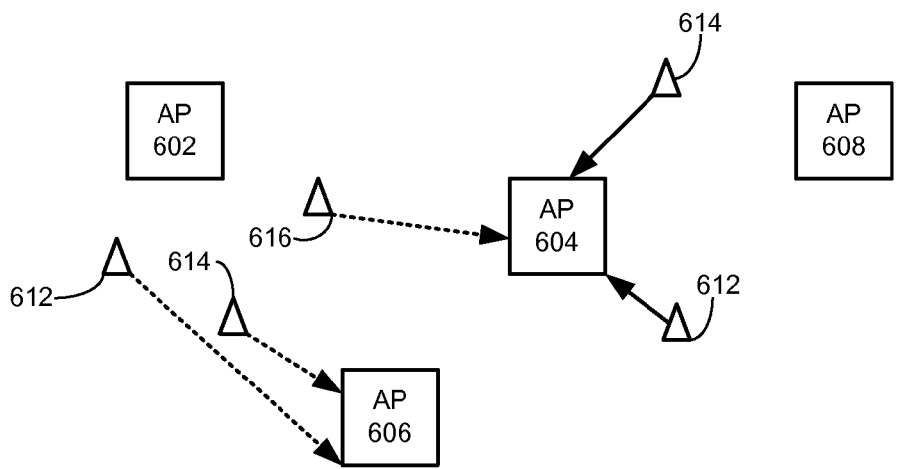
Figure 6C:
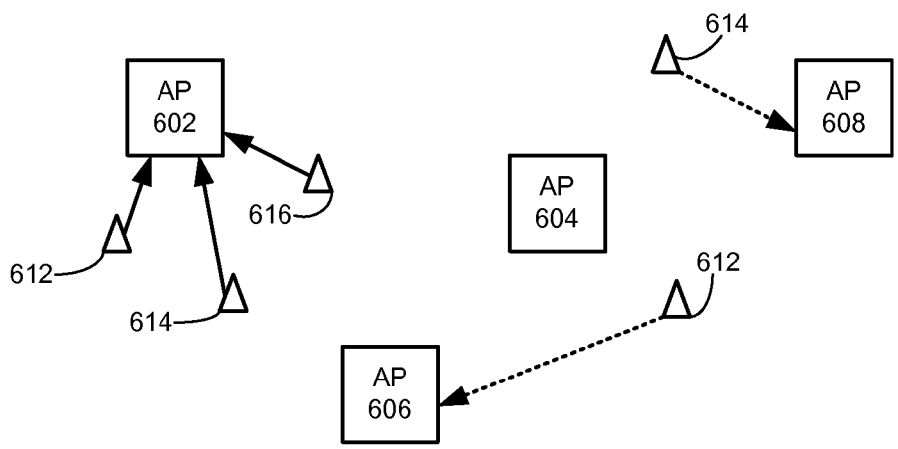

FIGS. 6A, 6B, and 6C illustrate an exemplary process of performing rolling maintenance on a number of APs without service disruption, in accordance with one embodiment of the present invention. Initially, as illustrated in FIG. 6A, APs 602, 604, 606, and 608 are deployed. AP 602 is associated with user stations 612, 614, and 616; and AP 604 is associated with user stations 612 and 614. When the system needs to conduct rolling maintenance (such as firmware upgrade or spectrum scan), the system first selects an AP to start with.

As illustrated in FIG. 6B, the first AP to undergo maintenance is AP 602. Correspondingly, AP 602 disassociates itself from user stations 612, 614, and 616, and hand them over to other APs. Specifically, user stations 612 and 614 are handed over to AP 606, and user station 616 is handed over to AP 604. (The new association is indicated by dotted lines.) After AP 602 disassociates itself from all the user stations, AP 602 can now perform the maintenance.

Subsequently, when the maintenance operation on AP 602 is complete, as shown in FIG. 6D, user stations 612, 614, and 616 are handed over back to AP 602. In addition, the next AP, which in this example 604, repeats the same procedure. That is, AP 604 hands over its associated user stations 612 and 614 to AP 606 and AP 608, respectively. After the hand-over, AP performs the maintenance procedure.

Alternatively, after the maintenance on AP 602 is complete, user stations 612, 614, and 616 may remain associated with their then-current APs (that is, user stations 612 and 614 remain associated with AP 606).

The aforementioned rolling maintenance process can repeat for each deployed AP, until all APs in the network has gone through the same maintenance process.

Exemplary AP System

Figure 7:
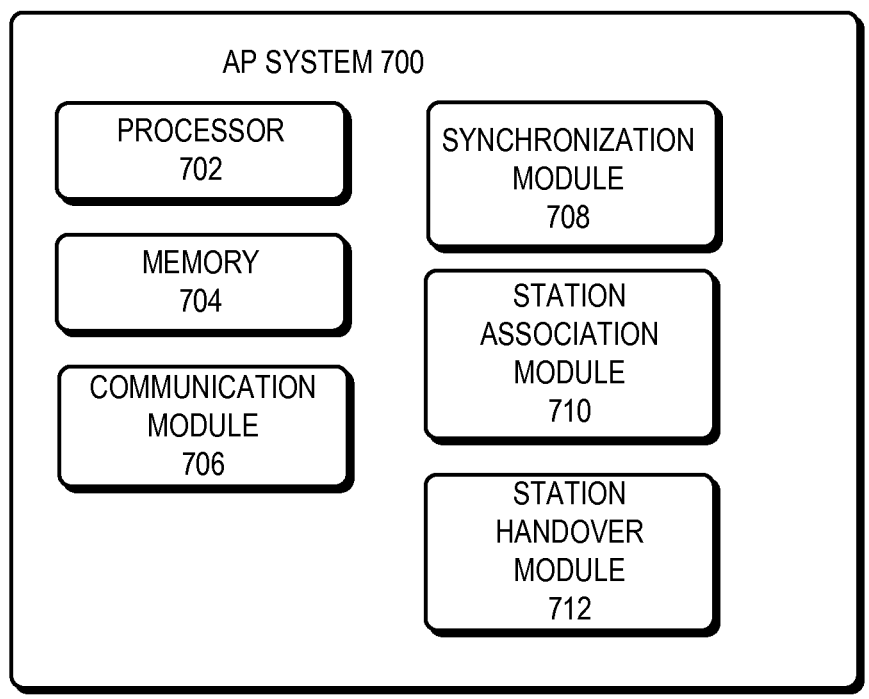
FIG. 7 illustrates an exemplary AP system that facilitates seamless roaming in a Wi-Fi network, in accordance with one embodiment of the present invention.

FIG. 7 illustrates an exemplary AP system that facilitates seamless roaming in a Wi-Fi network, in accordance with one embodiment of the present invention. In this example, an AP system 700 includes a processor 702, a memory 704, and a communication module 706, which can include a radio transceiver and an antenna (not shown).

Also included in AP system are a synchronization module 708, a station association module 710, and a station handover module 712. During operation, synchronization module 708 performs time synchronization with other APs, as described in conjunction with FIG. 3. Station association module 710 performs the station association process described in conjunction with FIG. 4. Station handover module 712 facilitates station roaming, as described in conjunction with FIG. 5.

The methods and processes described in the detailed description section can be embodied as code and/or data, which can be stored in a computer-readable storage device as described above. When a computer system reads and executes the code and/or data stored on the computer-readable storage device, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for associating a user station with an access point in a wireless network, comprising:
   receiving a first authentication packet from the user station;
   placing the user station in an association-arbitration list;
   broadcasting signal-strength indication associated with the user station;
   receiving signal-strength indication associated with the user station from other access points in the wireless network;
   determining whether the access point has the best signal strength associated with the user station; and
   in response to the access point having the best signal strength, associating the user station with the access point.

2. The method of claim 1, further comprising waiting for a predetermined period of time prior to determining whether the access point has the best signal strength, thereby allowing sufficient time for receiving signal-strength indication from other access points.

3. The method of claim 1, wherein associating the user station with the access point comprises:
   assigning an AID to the user station;
   setting a bit in an AID usage bitmap, wherein the bit corresponds to the assigned AID; and
   broadcasting the AID usage bitmap to other access points in the wireless network.

4. The method of claim 1, further comprising:
   determining that the signal strength associated with the user station is below a predetermined threshold;
   querying other access points for their signal strength associated with the same user station; and
   in response to there being at least one other access point receiving a sufficiently strong signal from the user station, handing over the user station to the access point with the strongest signal strength.

5. The method of claim 1, further comprising:
   handing over one or more user stations associated with the access point to one or more other access points; and
   performing maintenance on access point without disruption to service for the one or more user stations that have been handed over.

6. The method of claim 5, wherein performing maintenance comprises upgrading a firmware, performing spectrum scanning, or both.

7. A wireless access point, comprising a processor and a memory coupled to the processor and storing instructions which when executed by the processor cause the processor to perform a method for associating a user station with the access point, the method comprising:
   receiving a first authentication packet from the user station;
   placing the user station in an association-arbitration list;
   broadcasting signal-strength indication associated with the user station;
   receiving signal-strength indication associated with the user station from other access points in the wireless network;
   determining whether the access point has the best signal strength associated with the user station; and
   in response to the access point having the best signal strength, associating the user station with the access point.

8. The wireless access point of claim 7, wherein the method further comprises waiting for a predetermined period of time prior to determining whether the access point has the best signal strength, thereby allowing sufficient time for receiving signal-strength indication from other access points.

9. The wireless access point of claim 7, wherein associating the user station with the access point comprises:
   assigning an AID to the user station;
   setting a bit in an AID usage bitmap, wherein the bit corresponds to the assigned AID; and
   broadcasting the AID usage bitmap to other access points in the wireless network.

10. The wireless access point of claim 7, wherein the method further comprises:
    determining that the signal strength associated with the user station is below a predetermined threshold;
    querying other access points for their signal strength associated with the same user station; and
    in response to there being at least one other access point receiving a sufficiently strong signal from the user station, handing over the user station to the access point with the strongest signal strength.

11. The wireless access point of claim 7, wherein the method further comprises:
    handing over one or more user stations associated with the access point to one or more other access points; and
    performing maintenance on access point without disruption to service for the one or more user stations that have been handed over.

12. The wireless access point of claim 11, wherein performing maintenance comprises upgrading a firmware, performing spectrum scanning, or both.

13. A computer system for facilitating association of a user station with an access point in a wireless network, the computer system comprising:
    a processor;
    a receiving mechanism operable to receive a first authentication packet from the user station;
    a placement mechanism operable to place the user station in an association-arbitration list;
    a broadcast mechanism operable to broadcast signal-strength indication associated with the user station;
    wherein the receiving mechanism is further operable to receive signal-strength indication associated with the user station from other access points in the wireless network;
    a determination mechanism operable to determine whether the access point has the best signal strength associated with the user station; and
    an association mechanism operable to, in response to the access point having the best signal strength, associate the user station with the access point.

14. The computer system of claim 13, wherein the determination mechanism is further operable to wait for a predetermined period of time prior to determining whether the access point has the best signal strength, thereby allowing sufficient time for receiving signal-strength indication from other access points.

15. The computer system of claim 13, wherein while associating the user station with the access point, the association mechanism is further operable to:
- assign an AID to the user station;
- set a bit in an AID usage bitmap, wherein the bit corresponds to the assigned AID; and
- broadcast the AID usage bitmap to other access points in the wireless network.

16. The computer system of claim 13, further comprising:
- a handover mechanism operable to hand over one or more user stations associated with the access point to one or more other access points; and
- a maintenance mechanism operable to perform maintenance on access point without disruption to service for the one or more user stations that have been handed over.

17. The computer system of claim 16, wherein while performing maintenance, the maintenance mechanism is operable to upgrade a firmware, performing spectrum scanning, or both.

* * * * *